United States Patent
Takeda et al.

(10) Patent No.: US 11,212,046 B2
(45) Date of Patent: Dec. 28, 2021

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

(*) Notice: Subject to any disclaimer, the term of this patent is extended or adjusted under 35 U.S.C. 154(b) by 132 days.

(21) Appl. No.: 16/609,979

(22) PCT Filed: May 2, 2017

(86) PCT No.: PCT/JP2017/017295
§ 371 (c)(1),
(2) Date: Oct. 31, 2019

(87) PCT Pub. No.: WO2018/203396
PCT Pub. Date: Nov. 8, 2018

(65) Prior Publication Data
US 2020/0059332 A1 Feb. 20, 2020

(51) Int. Cl.
*H04L 5/00* (2006.01)
*H04W 72/04* (2009.01)

(52) U.S. Cl.
CPC ......... *H04L 5/0012* (2013.01); *H04W 72/044* (2013.01); *H04W 72/0413* (2013.01)

(58) Field of Classification Search
CPC .............. H04W 72/04; H04W 72/044; H04W 72/0413; H04L 5/0012; H04L 5/0053;
(Continued)

(56) References Cited

U.S. PATENT DOCUMENTS

2016/0143039 A1 5/2016 Baldemair et al.
2016/0226639 A1 8/2016 Xiong et al.
(Continued)

FOREIGN PATENT DOCUMENTS

| EP | 3468280 A1 | 4/2019 |
|---|---|---|
| WO | 2014209178 A1 | 12/2014 |
| WO | 2016122782 A1 | 8/2016 |
| WO | 2016142979 A1 | 9/2016 |

OTHER PUBLICATIONS

Intel Corporation: "Long PUCCH design aspects"; 3GPP DRAFT; RI-1705031,vol. RAN WG1, No. Spokane, USA; 20170403-201704072 Apr. 2017 (Apr. 2, 2017), XP051243162, Retrieved from the Internet:, Spokane, Intel Corporation, (Year: 2017).*

(Continued)

*Primary Examiner* — Kyaw Z Soe
(74) *Attorney, Agent, or Firm* — Osha Bergman Watanabe & Burton LLP

(57) ABSTRACT

A terminal in communication with a base station is disclosed including a transmitter that transmits uplink control information using an uplink control channel, and a processor that independently controls, based on information transmitted from the base station, application of intra-slot frequency hopping for the uplink control channel, and application of inter-slot frequency hopping for the uplink control channel. In other aspects, a base station in communication with a terminal and a radio communication method for a terminal in communication with a base station are also disclosed.

10 Claims, 14 Drawing Sheets

(58) Field of Classification Search
CPC ....... H04L 1/1861; H04L 5/0094; H04L 5/00; H04L 5/0042; H04L 5/0078; H04L 5/0055; H04L 5/001
See application file for complete search history.

(56) References Cited

U.S. PATENT DOCUMENTS

| | | | | |
|---|---|---|---|---|
| 2019/0052421 | A1* | 2/2019 | Yin | H04B 1/713 |
| 2019/0075581 | A1* | 3/2019 | Salem | H04W 74/006 |
| 2019/0159191 | A1 | 5/2019 | Kim et al. | |
| 2020/0107304 | A1* | 4/2020 | Wang | H04W 72/042 |

OTHER PUBLICATIONS

Extended European Search Report issued in counterpart European Patent Application No. 17908261.5, dated Nov. 3, 2020 (12 pages).

Intel Corporation; "On slot aggregation for data transmission"; 3GPP TSG RAN WG1 Meeting #88bis, R1-1704767; Spokane, USA, Apr. 3-7, 2017 (4 pages).

Intel Corporation; "Long PUCCH design aspects"; 3GPP TSG RAN WG1 Meeting #88bis, R1-1705031; Spokane, USA, Apr. 3-7, 2017 (5 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

3GPP TSG RAN WG1 Meeting #88bis; R1-1704211; "NR-PUCCH resource determination" Huawei, HiSilicon; Apr. 3-7, 2017(4 pages).

International Search Report issued in International Application No. PCT/JP2017/017295, dated Jun. 27, 2017 (5 pages).

Written Opinion issued in International Application No. PCT/JP2017/017295; dated Jun. 27, 2017 (4 pages).

* cited by examiner

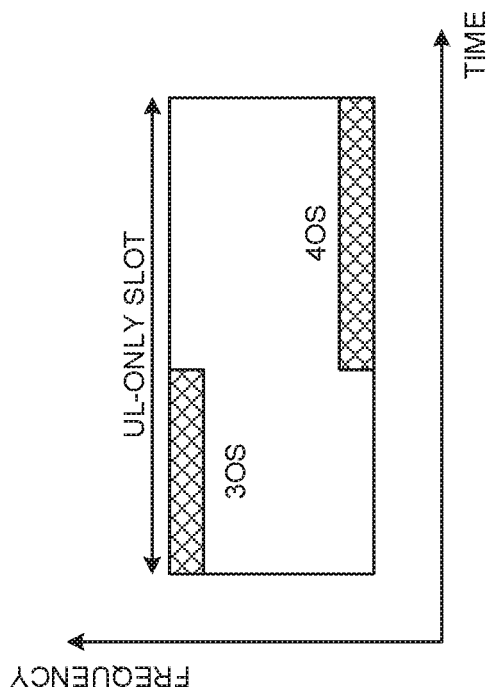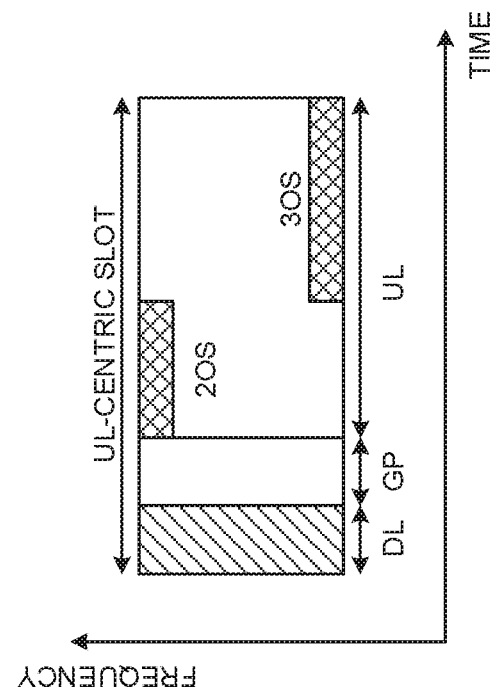

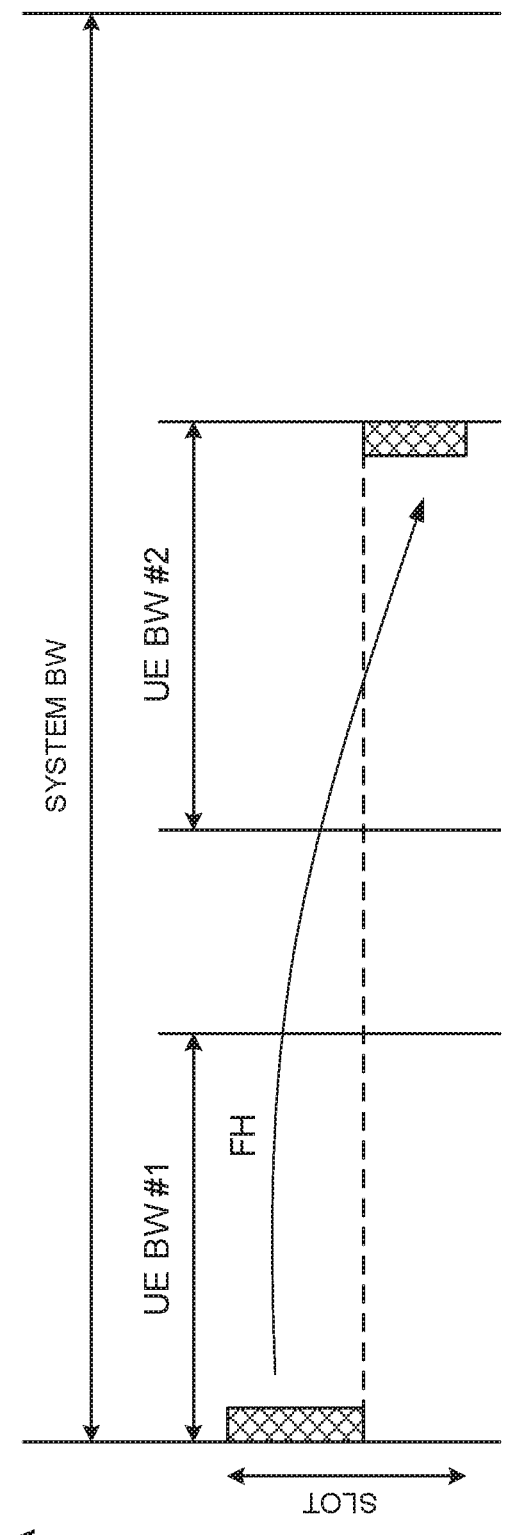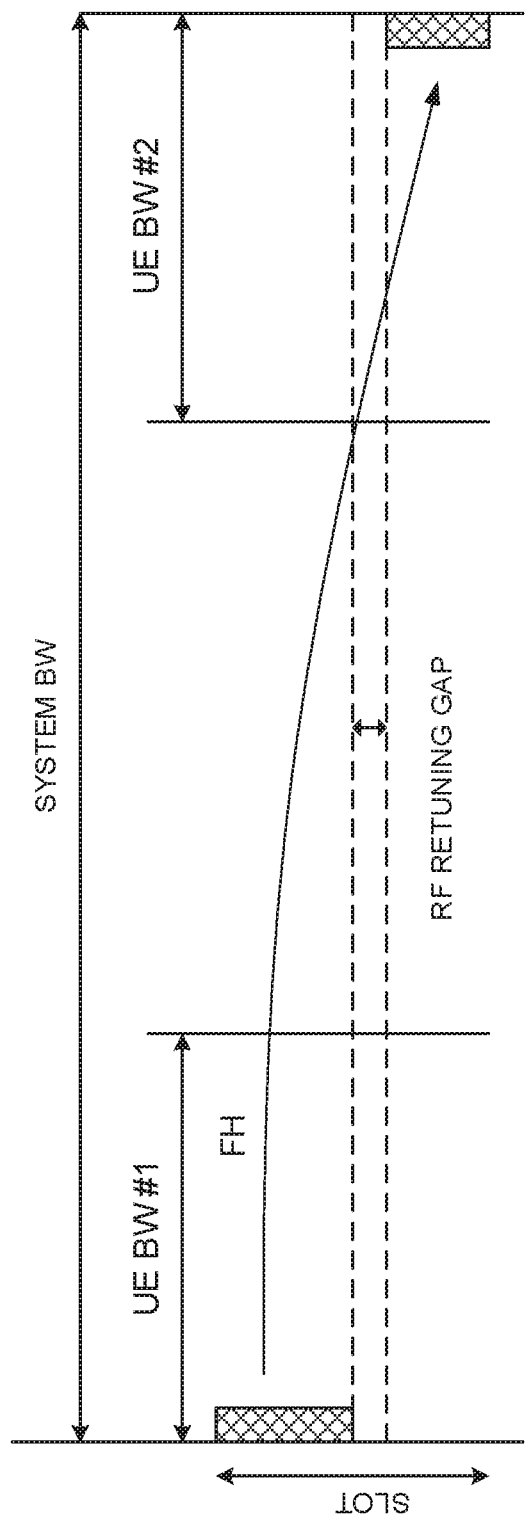
FIG. 4A
FIG. 4B

| FREQUENCY HOPPING MODE | MODE 1 | MODE 2 | MODE 3 | MODE 4 |
|---|---|---|---|---|
| INTRA-SLOT FREQUENCY HOPPING | Enabled (1) | Enabled (1) | Disabled (0) | Disabled (0) |
| INTER-SLOT FREQUENCY HOPPING | Enabled (1) | Disabled (0) | Enabled (1) | Disabled (0) |

FIG. 7

USER TERMINAL AND RADIO COMMUNICATION METHOD

TECHNICAL FIELD

The present invention relates to a user terminal and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower latency and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 8 to 13), downlink (DL) and/or uplink (UL) communication are performed using one-ms subframes (also referred to as "transmission time intervals (TTIs)" and so on). These subframes are the time unit for transmitting one channel-encoded data packet, and serve as the unit of processing in, for example, scheduling, link adaptation, retransmission control (HARQ (Hybrid Automatic Repeat reQuest)) and so on.

Also, in existing LTE systems (for example, LTE Rel. 8 to 13), a user terminal transmits uplink control information (UCI) by using a UL control channel (for example, PUCCH (Physical Uplink Control Channel)) or a UL data channel (for example, PUSCH (Physical Uplink Shared Channel)). The format of this UL control channel is referred to as "PUCCH format" and so on.

UCI includes at least one of a scheduling request (SR), retransmission control information (HARQ-ACK (Hybrid Automatic Repeat reQuest-Acknowledgement), ACK and/or NACK (Negative ACK)) in response to DL data (DL data channel (for example, PDSCH (Physical Downlink Shared Channel))), and channel state information (CSI).

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

It is assumed that future radio communication systems (for example, LTE Rel. 14, LTE Rel. 15 (or later versions), 5G, NR, etc.) will transmit UCI using a UL control channel of a different format than existing LTE systems (for example, LTE Rel. 13 and/or earlier versions).

For example, the PUCCH formats for use in existing LTE systems are comprised of one-ms subframe units. Meanwhile, for future radio communication systems, a study is in progress to support a UL control channel having a shorter duration than existing LTE systems (hereinafter also referred to as a "short PUCCH"). Furthermore, a study is in progress to support a UL control channel having a longer duration than this short PUCCH (hereinafter also referred to as a "long PUCCH").

In this way, it is predictable that various UL control channels (such as short PUCCH and/or long PUCCH) will be supported in future radio communication systems, but the problem lies in how to control the transmission of the PUCCH.

The present invention has been made in view of the above, and it is therefore an object of the present invention to provide a user terminal and a radio communication method, whereby transmission can be performed adequately by using uplink control channels that have different formats than in existing LTE systems.

Solution to Problem

According to one aspect of the present invention, a user terminal has a transmission section that transmits uplink control information, and a control section that controls transmission of the uplink control information by using an uplink control channel. The control section determines the allocation period and/or the allocation location of the uplink control channel based on at least one of a format of the uplink control information, a starting position of the uplink control channel in a time direction and information reported from a radio base station.

Advantageous Effects of Invention

According to the present invention, it is possible to perform transmission adequately by using uplink control channels having different formats than in existing LTE systems.

BRIEF DESCRIPTION OF DRAWINGS

FIGS. 2A and 2B are diagrams, each showing an example of transmitting a long PUCCH in one slot;

FIGS. 4A and 4B are diagrams to show other examples of intra-slot frequency hopping;

FIG. 7 is a diagram to show another example of controlling a long PUCCH, according to a first example;

DESCRIPTION OF EMBODIMENTS

Future radio communication systems (for example, LTE Rel. 14, 15 and/or later versions, 5G, NR, etc.) are under study for introducing multiple numerologies (including, for example, subcarrier spacing and/or symbol duration), not a single numerology. For example, future radio communication systems may support multiple subcarrier spacings such as 15 kHz, 30 kHz, 60 kHz, 120 kHz and 240 kHz.

Also, future radio communication systems are being studied to introduce time units (also referred to as "subframes," "slots," "minislots," "subslots," "transmission time intervals (TTIs)," "short TTIs," "radio frames" and so on) that are the same as and/or different than existing LTE systems (LTE Rel. 13 or earlier versions), while supporting multiple numerologies and so on.

Subframes may be defined as units of time having a predetermined time duration (for example, 1 ms), regardless of what numerology a user terminal (for example, UE (User Equipment)) uses. On the other hand, slots may be defined as units of time that depend on what numerology a user terminal uses.

For example, if the subcarrier spacing is 15 kHz or 30 kHz, the number of symbols per slot may be seven or fourteen. Meanwhile, when the subcarrier spacing is 60 kHz or greater, the number of symbols per slot may be fourteen. In addition, a slot may include a plurality of minislots (sub slots).

Generally, subcarrier spacing and symbol duration hold a reciprocal relationship. Consequently, as long as the number of symbols per slot (or minislot (subslot)) stays the same, the higher (wider) the subcarrier spacing, the shorter the slot length, and the lower (narrower) the subcarrier spacing, the longer the slot length. Note that "subcarrier spacing is high" may be paraphrased as "subcarrier spacing is wide," and "subcarrier spacing is low" may be paraphrased as "subcarrier spacing is narrow."

For such future radio communication systems, a study is in progress to support a UL control channel (hereinafter also referred to as a "short PUCCH") that is structured to be shorter in duration than the PUCCH formats of existing LTE systems (for example, LTE Rel. 13 and/or earlier versions) and/or a UL control channel (hereinafter also referred to as a "long PUCCH") that is structured to have a longer duration than the above short duration.

Figure 1A:
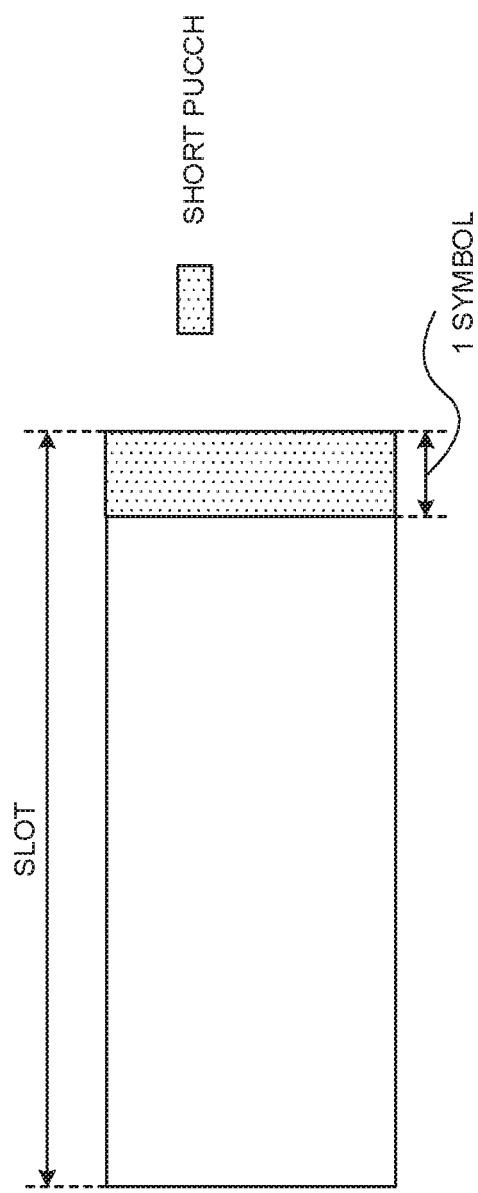
FIGS. 1A and 1B provide diagrams, each showing an example of the format of a UL control channel.
Figure 1B:
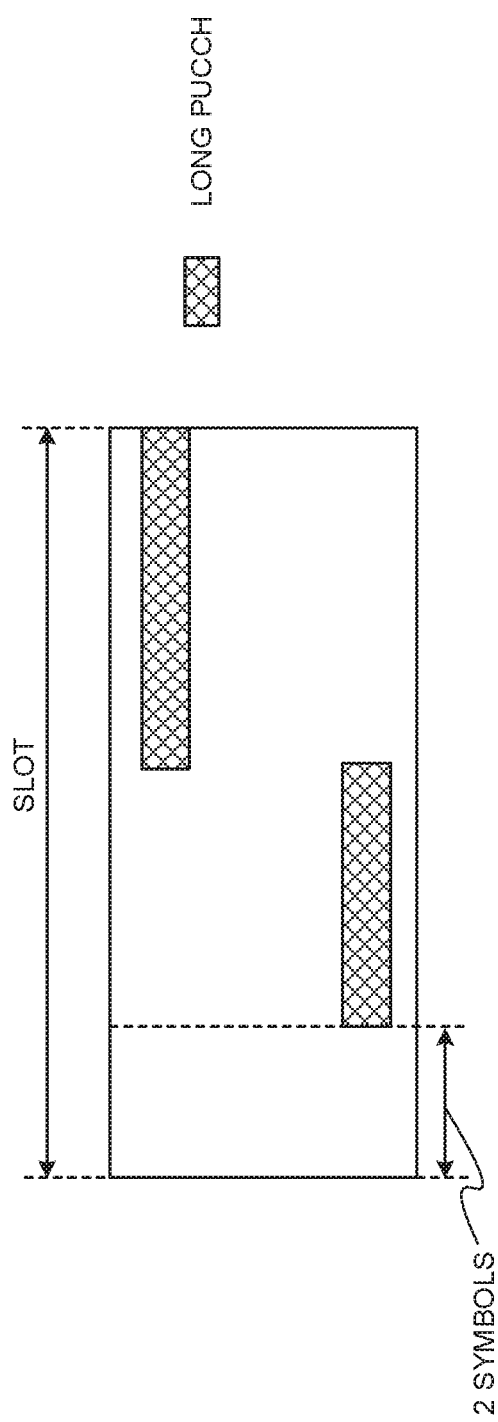

FIGS. 1A and 1B provide diagrams, each showing an example of the format of a UL control channel in a future radio communication system. FIG. 1A shows an example of a short PUCCH, and FIG. 1B shows an example of a long PUCCH. As shown in FIG. 1A, a short PUCCH is allocated to a predetermined number of symbols (here, one symbol) from the end of the slot. Note that the symbol to allocate the short PUCCH is not confined to the end of a slot, and a predetermined number of symbols at the top or in the middle of a slot may be used as well. In addition, the short PUCCH is placed in one or more frequency resources (for example, one or more physical resource blocks (PRBs)).

Also, the short PUCCH may be time-division-multiplexed and/or frequency-division-multiplexed with the UL data channel (hereinafter also referred to as "PUSCH") within a slot. Also, within a slot, the short PUCCH may be time-division-multiplexed and/or frequency-division-multiplexed with the DL data channel (hereinafter also referred to as the "PDSCH") and/or the DL control channel (hereinafter also referred to as the "PDCCH (Physical Downlink Control Channel)").

With the short PUCCH, a multi-carrier waveform (for example, the OFDM (Orthogonal Frequency Division Multiplexing) waveform) may be used, or a single-carrier waveform (for example, the DFT-s-OFDM (Discrete Fourier Transform-Spread-Orthogonal Frequency Division Multiplexing) waveform) may be used.

Meanwhile, referring to FIG. 1B, the long PUCCH is allocated over a plurality of symbols in a slot, so as to improve the coverage over the short PUCCH. Although FIG. 1B shows a case in which the long PUCCH is not allocated to a predetermined number of symbols at the top of the slot (two symbols in this case), but this is by no means limiting. A format to allocate the long PUCCH to a predetermined number of symbols at the top may be uses here. Also, the long PUCCH may be comprised of a number of frequency resources to match a short PUCCH, or may be formed with a smaller number of frequency resources (for example, one or two PRBs) than a short PUCCH, in order to achieve a power boosting effect.

Also, the long PUCCH may be frequency-division-multiplexed with the PUSCH within a slot. In addition, a long PUCCH may be time-division-multiplexed with a PDCCH within a slot. Also, a long PUCCH may be placed with a short PUCCH in the same slot. For a long PUCCH, a single-carrier waveform (for example, DFT-s-OFDM waveform) may be used, or a multi-carrier waveform (for example, OFDM waveform) may be used. A long PUCCH may support transmission antenna diversity.

In addition, research is underway to transmit a long PUCCH by using one time unit (for example, one slot and/or the like) or multiple time units. When transmitting long PUCCH over a number of slots, the total of the periods where the long PUCCH is allocated (or the transmission period) may be limited to a predetermined value (for example, 1 ms).

In addition, when the number of uplink control information (UCI) bits is equal to or less than a predetermined value (for example, one or two bits), it may be possible to repeat transmitting the UCI in a plurality of slots (for example, in N slots). These N slots may be neighboring (contiguous) slots in which the long PUCCH is configured, or may be non-contiguous slots.

In addition, studies are also in progress to configure the period (for example, the number of symbols) for allocating long PUCCH, per slot. For example, the period to allocate a long PUCCH (for example, the number of symbols) in a slot may be selected and determined from a set of multiple candidates. The set of multiple candidates is, for example, {4, 5, 6, 7, 8, 9, 10, 11, 12, 13, 14}. In other words, studies are underway to make the number of symbols of long PUCCH equal to or greater than a predetermined value (for example, four symbols), and controlling the period for allocating long PUCCH per slot, separately.

However, if the period for allocating long PUCCH (for example, the number of symbols) is configured independently in each slot, the problem lies in how to control the transmission of long PUCCH. For example, when a long PUCCH is transmitted in a slot, it is necessary to appropriately determine the period and location for allocating the long PUCCH, and control transmission. In addition, as shown in FIG. 1B, research is underway to apply frequency hopping to long PUCCH in a slot (intra-slot frequency-hopping). Consequently, when the period for allocating a long PUCCH (for example, the number of symbols) is configured independently in each slot, it is necessary to determine the pattern of frequency hopping appropriately (when using frequency hopping) and control transmission.

Consequently, the present inventors have focused on the fact that the period (for example, the number of symbols) to allocate PUCCH is configured per predetermined time unit (for example, per slot), and thereupon come up with the idea of allowing a user terminal to determine at least one of the period to allocate PUCCH, the location to allocate PUCCH and the frequency hopping pattern, based on predetermined information, and control PUCCH transmission.

In addition, although long PUCCH might be transmitted using multiple slots, in this case, how to control the transmission of the long PUCCH is the problem. So the present inventors have come up with the idea of determining the number and/or locations of slots to use to transmit PUCCH (or UCI), in addition to the period and location for allocating PUCCH, based on predetermined information, and controlling PUCCH transmission.

Now, the present embodiment will be described below in detail. Each of the embodiments described below may be implemented in combination as appropriate. In the following description, slots will be described as examples of predetermined time units, but other time units (for example, subframes, minislots, subslots, TTIs, short TTIs, radio frames, etc.) may be applied similarly to transmission. Also, cases will be described in the following description in which the number of symbols to constitute a slot is seven, but other numbers of symbols (for example, 14 symbols) may be used as well. Furthermore, although long PUCCH will be exemplified in the following description, the following description may be applied to short PUCCH as well. Furthermore, although long PUCCH will be exemplified in the following description, the following description may be applied to short PUCCH as well.

First Example

With a first example of the present invention, a case will be described below where long PUCCH is transmitted in one slot.

FIGS. 2A and 2B show examples of transmitting long PUCCH in a slot, by using frequency hopping. FIG. 2A shows a case in which a UL signal and/or a UL channel (for example, PUSCH and/or PUCCH) are transmitted using all the symbols in a slot (here, in seven symbols). A slot like this, in which UL transmission spans the entire duration of the slot, is also referred to as a "UL-only slot."

FIG. 2B shows a case in which UL transmission takes place in some of the symbols in a slot (here, in five symbols). In FIG. 2B, a DL signal and/or a DL channel (for example, PDCCH) are transmitted and received in a predetermined number of symbols (here, one symbol at the top), and UL signals and/or UL channels are transmitted in the rest of the symbols. Also, between DL communication and UL communication, a period for switching between DL and UL (gap period) may be provided. A slot like this, in which UL communication (for example, PUSCH transmission) is performed by using some of the symbols in the slot, is also referred to as "UL-centric slot." Note that the slots that are applicable to long PUCCH are by no means limited to UL-only slots and/or UL-centric slots.

A user terminal determines at least one of the period to allocate a long PUCCH (for example, the number of symbols), the location to allocate the long PUCCH and the frequency hopping pattern (including whether to enable or disable frequency hopping), based on predetermined information, and controls long PUCCH transmission.

The predetermined information may be at least one of information related to the configuration of uplink control information (for example, the number of UCI bits, the type of UCI, and so on), the starting position of the PUCCH in the time direction, and information reported from the radio base station. The information to be reported from the radio base station to the user terminal may be information about the period (the number of symbols) and/or the location for allocating PUCCH. Also, the information that is reported from the radio base station to the user terminal may be information to indicate whether intra-slot frequency hopping is enabled or disabled.

Examples of methods of determining the period and the location for allocating a long PUCCH, whether to enable or disable frequency hopping and the pattern of frequency hopping, will be described below.

<Period/Location to Allocate Long PUCCH>

A user terminal may determine the period and/or the location for allocating a long PUCCH, in an implicit way, based on at least one of the size of uplink control information (UCI), the type of UCI (UCI type) and the starting position of the PUCCH in the time direction. Alternatively, the user terminal may determine the period and/or the location for allocating a long PUCCH, in an explicit way, based on information reported from the radio base station.

[UCI Size]

When the period and/or the location for allocating a long PUCCH are determined based on the size of UCI, UCI sizes and long PUCCH allocation periods are configured in association with each other. For example, when the size of UCI is equal to or smaller than a predetermined value (for example, two bits), a long PUCCH is allocated to a predetermined number of periods (for example, four symbols). This predetermined number may be the minimum value that can be configured as the period for allocating a long PUCCH, or may be different values. The location where the long PUCCH is allocated may be, for example, the four symbols of the first half or the four symbols of the second half of the UL transmission period in the slot.

Furthermore, when the size of UCI is larger than a predetermined value, the whole slot may be used as the long PUCCH allocation period. In the event a slot is a UL-only slot, the user terminal transmits a long PUCCH by using all symbols in the slot (for example, seven symbols). In the event a slot is a UL-centric slot, the user terminal has to transmit the long PUCCH using the symbols of the UL transmission part in the slot (for example, five symbols).

In this way, the period and/or the location for allocating a long PUCCH are determined based on the size of UCI, so that the long PUCCH can be configured flexibly, depending the size of UCI. By this means, when the size of UCI is small, it is possible to reduce the period for allocating a long PUCCH, so that the efficiency of the use of resources can be improved.

[Type of UCI]

When the period and/or the location for allocating a long PUCCH are determined based on the type of UCI (UCI type), UCI types and long PUCCH allocation periods are configured in association with each other. For example, when UCI is the first signal, a long PUCCH is allocated to a predetermined number of periods (for example, four symbols). This predetermined number may be the minimum value that can be configured as the period for allocating a long PUCCH, or may be different values. The location to allocate a long PUCCH may be, for example, the four symbols of the first half or the four symbols of the second half of the UL transmission period in the slot.

Also, when UCI is a second signal, the whole slot may be used as the long PUCCH allocation period. In the event a slot is a UL-only slot, the user terminal transmits a long PUCCH by using all symbols in the slot (for example, seven symbols). In the event a slot is a UL-centric slot, the user terminal may transmit a long PUCCH using the symbols of the UL transmission part in the slot (for example, five symbols).

The first signal may be, for example, a delivery acknowledgment signal (HARQ-ACK). The second signal may be, for example, channel state information (CSI). Note that the first signal may be a combination of an HARQ-ACK and a scheduling request. Also, the second signal may be a combination of CSI and one or more HARQ-ACKs, or a combination of a predetermined number of or more HARQ-ACKs.

In this way, the period and/or the location for allocating a long PUCCH are determined based on UCI types, so that the long PUCCH can be configured flexibly, based on UCI types. In this way, when a specific type of UCI (for example, an HARQ-ACK with a small amount of information) is transmitted, it is possible to reduce the period for allocating a long PUCCH, so that the efficiency of the use of resources can be improved. Also, when a specific type of UCI (for example, CSI with a large amount of information) is transmitted, it is possible to increase the period for allocating a long PUCCH, so that transmission can be performed at lower coding rates.

[Starting Position of PUCCH]

When the period and/or the location for allocating a long PUCCH are determined based on the starting position of the PUCCH in the time direction, PUCCH starting positions and long PUCCH allocation periods are configured in association with each other. For example, given that one slot is constituted by seven symbols (symbols #0 to #6), if the starting position of PUCCH is a predetermined symbol (for example, symbol #3), a long PUCCH is allocated to a predetermined number of periods (for example, four symbols). The location for allocation a long PUCCH in a slot may be symbols after the starting position of the long PUCCH (for example, symbols #3 to #6).

Also, assuming that one slot is constituted by 14 symbols (symbols #0 to #13), if the starting position of PUCCH is a predetermined symbol (for example, symbol #10), a long PUCCH is allocated to a predetermined number of periods (for example, four symbols). The location for allocating a long PUCCH in a slot may be symbols after the starting position of the long PUCCH (for example, symbols #10 to #13).

The user terminal can judge the starting position of the PUCCH from the structure of the slot (slot type) or from information related to the starting position of the PUCCH reported from the radio base station.

In this way, the period and/or the location for allocating a long PUCCH are determined based on the starting position of the PUCCH, so that the format of the long PUCCH can be determined in a simple way.

[Report from Radio Base Station]

When the period and/or the location for allocating a long PUCCH are determined based on information reported from the radio base station, this information related to the period and/or the location for allocating a long PUCCH is reported to the user terminal. For example, the radio base station reports information regarding the period and/or the location for allocating a long PUCCH to a user terminal by using higher layer signaling (for example, RRC signaling, broadcast signal and so forth) and/or downlink control information (DCI).

The downlink control information may be user terminal-specific control information (also referred to as "UE-specific DCI," "UE-specific PDCCH," or "UE-specific search space"), or may be control information that applies to a number of user terminals in common (also referred to as "UE-common DCI," "group-common PDCCH," or "common search space"). For example, when the same PUCCH allocation period and allocation location are configured for a predetermined group of UEs, the radio base station includes information related to this allocation period and/or allocation location of the long PUCCH in user terminal-common information, and reports this.

<Setting of Frequency Hopping>

A user terminal can determine whether to enable or disable intra-slot frequency hopping based on information reported from the radio base station. For example, the radio base station reports information about whether to enable or disable intra-slot frequency hopping to the user terminal by using higher layer signaling (for example, RRC signaling, broadcast signal and so forth) and/or downlink control information (DCI).

When intra-slot frequency hopping is enabled for long PUCCHs, frequency diversity gain can be achieved in the time domain. Also, when intra-slot frequency hopping is disabled for long PUCCHs, a long PUCCH to be transmitted in one slot and a long PUCCH to be transmitted over multiple slots can co-exist adequately. In addition, long PUCCHs that are transmitted over multiple slots can also co-exist adequately.

<Frequency Hopping Pattern>

When intra-slot frequency hopping is enabled for long PUCCHs, a user terminal determines the frequency hopping pattern based on predetermined information and/or predetermined rules. Hereinafter, the method for determining frequency hopping patterns in the time domain and in the frequency domain will be described.

[Time Domain]

Option 1

In a slot, the user terminal controls the number of symbols of a long PUCCH to be equal as much as possible before and after a frequency hop (between long PUCCHs in different frequency fields) in a slot (option 1). For example, in a slot, the first part of a frequency hop (a long PUCCH mapped to the first frequency field) is constituted by half of the symbols of the slot length and the second part (a long PUCCH mapped to the second frequency field) is constituted by the rest of the symbols. Considering that the slot is constituted by an odd number of symbols, the number of symbols of the first part may be set to an integer by applying a floor function or a ceiling function (floor (slot length/2) or ceiling (slot length/2)) to ½ of the slot length.

Note that the value obtained by applying a floor function to ½ of the slot length may be applied to the second part, and the rest of the symbols (the slot length—the number of symbols of the second part) may be made the first part. This makes it possible to coordinate the number of long PUCCH symbols before and after a frequency hop. Also, the pattern of time fields (the number of symbols) is determined by taking into account the number of symbols in a slot, so that it is possible to reduce the overhead of reference signals, and reduce the number of times (time cycle) to make a transition in the frequency direction.

Option 2

Also, the user terminal may control the number of symbols of a long PUCCH to be equal as much as possible before and after a frequency hop, in the UL communication part in a slot (between long PUCCHs in different frequency fields) (option 2). For example, in the part of UL communication in a slot, the first part of the frequency hop is constituted by half of the symbols of the UL communication part and the second part is constituted by the rest of the symbols. Considering that the UL communication part is constituted by an odd number of symbols, the number of symbols of the first part may be set to an integer by applying a floor function or a ceiling function (floor (UL communication part/2) or ceiling (UL communication part/2)) to ½ of the UL communication part.

Note that the value obtained by applying a floor function to ½ of the UL communication part may be applied to the second part, and the rest of the symbols (the UL communication part—the number of symbols of the second part) may be made the first part. In this way, by taking into account the number of symbols that are actually used in UL communication, the number of symbols of a long PUCCH can be coordinated as much as possible before and after a frequency hop. Also, the pattern (the number of symbols) of time fields is determined by taking into account the number of symbols constituting the part that corresponds to UL communication in a slot, it is possible to allow long PUCCHs having various allocation periods to co-exist, in an effective way, within one slot.

Option 3

Also, the user terminal may control a long PUCCH to be mapped to a different frequency field per predetermined symbols (for example, every x symbols) (option 3). The value of x may be, for example, one of 1, 2, 3, 4, 5, 6 and 7. Also, the value of x may be reported from the radio base station to the user terminal via higher layer signaling and/or downlink control information. In this way, the location to map a long PUCCH can be switched and configured flexibly in the time domain.

[Frequency Domain]

Figure 3:
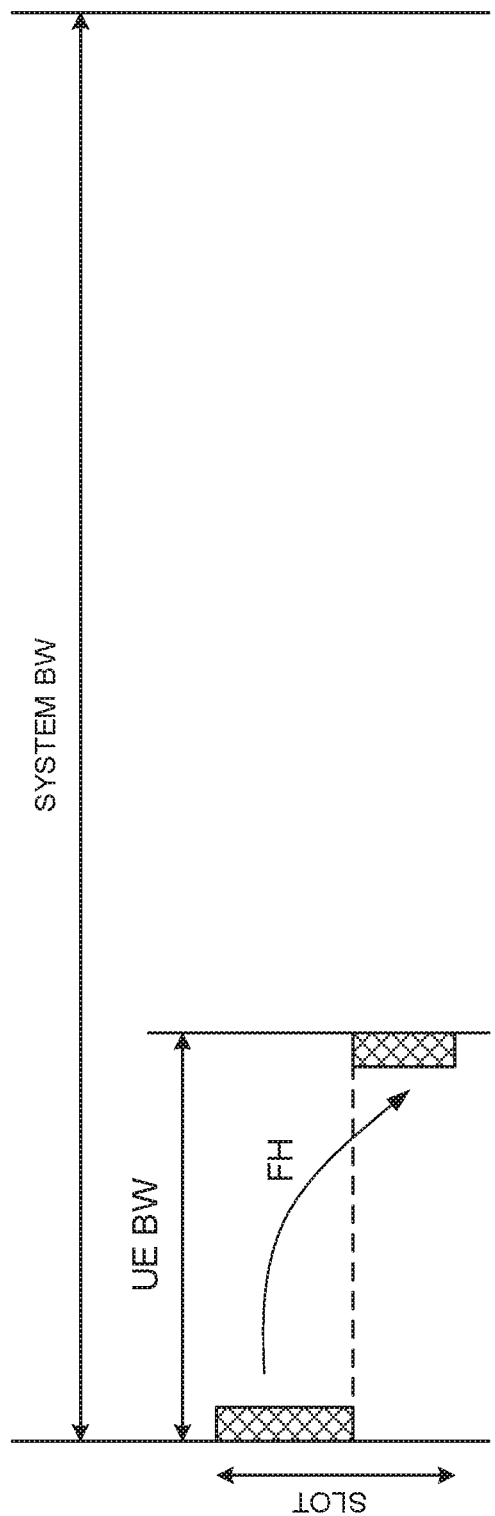
FIG. 3 is a diagram to show an example of intra-slot frequency hopping.

The user terminal controls a long PUCCH to be allocated symmetrically before and after a frequency hop with respect to a UE-specific UL center frequency or the DC subcarrier transmitted by the user terminal (see FIG. 3). The UE-specific UL center frequency refers to the center frequency of an uplink frequency bandwidth that is configured for each user terminal. FIG. 3 shows a case where long a PUCCH hops based on the center frequency of a user terminal-specific frequency field (UE BW), which is configured in a part of the system band.

In this way, by setting a reference value for frequency hopping for each user terminal, even when the bandwidth to use for communication is configured per user terminal (for example, configured in a part of the system band), long PUCCHs can be transmitted appropriately for each user terminal.

Alternatively, the user terminal controls a long PUCCH to be allocated symmetrically before and after a frequency hop with respect to a UE-specific DL center frequency or the DC subcarrier received by the user terminal. The UE-specific DL center frequency refers to the center frequency of a downlink frequency bandwidth that is configured for each user terminal. By using the center frequency of the frequency band for DL communication, even when the DL and UL communication bands and bandwidths are the same and the UL center frequency or the DC subcarrier is not configured, it is still possible to transmit long PUCCHs properly.

Alternatively, the user terminal may control a long PUCCH to be allocated symmetrically before and after a frequency hop with respect to a cell-specific center frequency. For example, when the user terminal communicates using the whole frequency band used in the cell (for example, CC), the same control method as in existing LTE systems can be used by using frequency domain hopping with respect to the center frequency of the cell.

Also, when a number of frequency bands (for example, frequency bands for use in UL communication) are configured in the user terminal, hopping of long PUCCHs may be enabled among these multiple frequency bands (see FIGS. 4A and 4B). In this way, by enabling frequency hopping by using a number of frequency bands configured in the user terminal, it is possible to achieve a higher frequency diversity gain by using RF BW adaptation that temporally switches the RF bandwidth for use in communication.

FIG. 4A shows a case where two frequency bands (UE BW #1 and #2) for use in UL communication are configured within a system band of a certain carrier (for example, CC). In this case, the user terminal performs frequency hopping so that a long PUCCH is mapped to each of the two frequency bands.

In this way, a frequency diversity effect can be obtained by transmitting a long PUCCH using a plurality of frequency bands that are configured. Furthermore, when a long PUCCH is transmitted by using a plurality of frequency bands, the user terminal may include and transmit UCI (for example, HARQ-ACK and/or CSI) for one frequency band or UCI for multiple frequency bands.

In addition, when frequency hopping is enabled across multiple frequency bands configured in the terminal, the user terminal may provide gap periods (GPs) before and after a frequency hop in the time direction (see FIG. 4B). By providing a gap period in the time direction, the user terminal can reserve a period for RF retuning when a long PUCCH hops between different frequency fields. This period may be referred to as an "RF retuning gap."

The period of an RF retuning gap may be configured in predetermined time (for example, slot or symbol) units. The period of an RF retuning gap may be a fixed value even if a plurality of frequency bands are configured, or may be configured according to intervals of a plurality of frequency bands, the number of frequency bands to be configured, and the like.

Figure 5B:
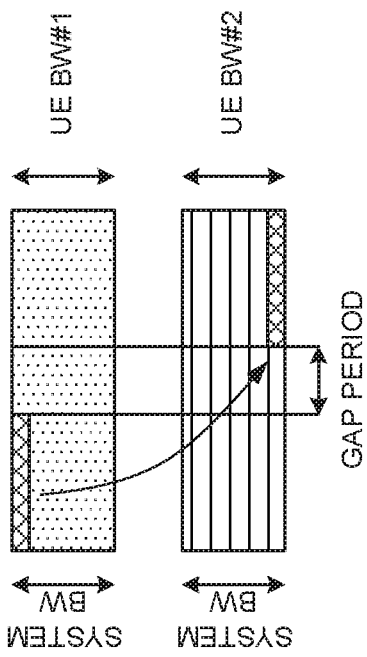
FIGS. 5A to 5C are diagrams to show other examples of intra-slot frequency hopping.

Frequency hopping does not need to be enabled between multiple frequency fields configured in the same carrier (for example, CC), and may be executed using frequency fields that are respectively configured in different carriers. FIG. 5A shows a case of mapping long PUCCHs to multiple frequency fields (enabling frequency hopping) configured in the same carrier, and FIG. 5B shows a case of mapping (enabling frequency hopping) long PUCCH to a frequency field that is respectively configured in different carriers. That is, in FIG. 5B, frequency hopping of long PUCCHs is enabled across multiple carriers.

Figure 5C:
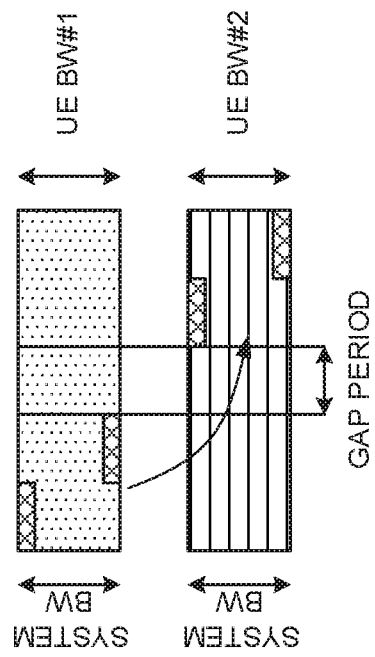
Figure 5A:
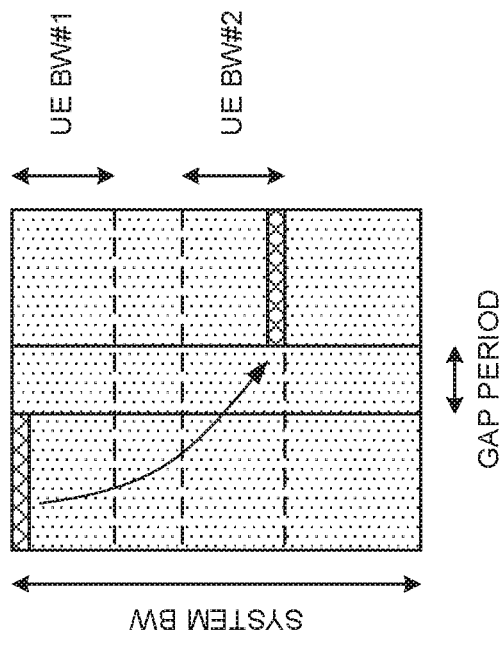

Also, a combination of intra-carrier frequency hopping and inter-carrier frequency hopping may be used (see FIG. 5C). In FIG. 5C, frequency hopping is enabled in each frequency field (UE BW #1 and #2) of each carrier, and, furthermore, frequency hopping is enabled across carriers.

With this configuration, it is possible to distribute long PUCCHs in different frequency fields, so that frequency diversity effect can be achieved in an effective way. Note that the configuration of FIG. 5C can be applied similarly to the case where a plurality of frequency bands (for example, UE BW #1 and #2) are configured in the same carrier (for example, FIG. 5A).

When frequency hopping is enabled across multiple carriers (see, for example, FIG. 5B), different transmission conditions may be applied to long PUCCHs that are mapped to different frequency bands. For example, in the first part transmitted in UE BW #1 in the long PUCCH and the second part transmitted in UE BW #1, timing advance may be independently configured and controlled. Also, in the first part transmitted in UE BW #1 in the long PUCCH and the second part transmitted in the UE BW #1, transmission power control and/or power accumulation control based on TPC commands may be performed independently.

In this way, by controlling the transmission of long PUCCHs on a per carrier basis when frequency hopping is enabled across different carriers, it is possible to control the transmission of long PUCCHs flexibly by taking into account other signals and the like transmitted for each carrier.

Also, the period and/or the location for allocating a long PUCCH may be associated with a predetermined frequency hopping pattern. In this case, the user terminal can recognize the period and/or the location for allocating a long PUCCH and select a predetermined frequency hopping pattern.

Second Example

According to a second example of the present invention, a case will be described where a long PUCCH is transmitted over multiple slots.

Figures 6A, 6B:
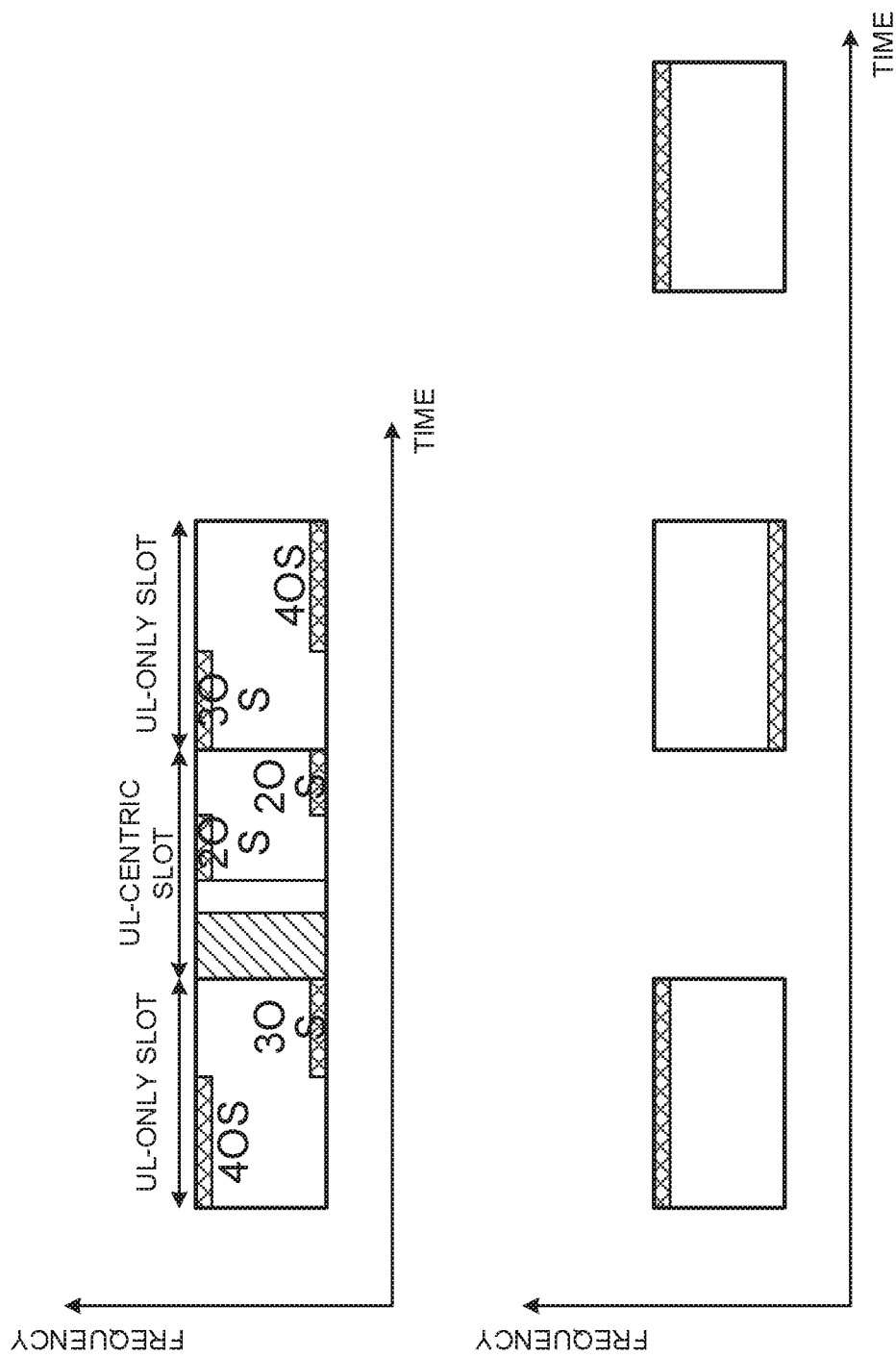
FIGS. 6A and 6B are diagrams, each showing an example of transmitting a long PUCCH by using multiple slots.

FIGS. 6A and 6B show examples of transmitting a long PUCCH by using multiple slots (here, three slots). FIG. 6A shows a case where a long PUCCH is mapped spanning contiguous slots (here, three contiguous slots). Also, FIG. 6A shows a case where frequency hopping (intra-slot frequency-hopping) is used in transmission in each slot (for example, repeated transmission).

FIG. 6B shows a case where a long PUCCH is mapped spanning non-contiguous slots (here three non-contiguous slots). Also, FIG. 6B shows a case where frequency hopping (inter-slot frequency-hopping) is used in transmission between slots transmitting long PUCCHs.

Based on predetermined information, the user terminal determines at least one of the period for allocating the long PUCCH (for example, the number of symbols), the location for allocating the long PUCCH and the frequency hopping pattern (including whether to enable or disable frequency hopping), and controls the transmission of the long PUCCH.

The predetermined information may be at least one of information related to the configuration of uplink control information (for example, the number of UCI bits, the type of UCI, and so on), the starting position of the PUCCH in the time direction, and information reported from the radio base station. The information to be reported from the radio base station to the user terminal may be information about the period (the number of symbols) and/or the location for allocating the PUCCH. Also, the information that is reported from the radio base station to the user terminal may be information to indicate whether intra-slot frequency hopping is enabled or disabled.

Furthermore, the predetermined information includes the number of slots used to transmit the long PUCCH, the locations of slots, and information to indicate whether to enable or disable intra-slot frequency hopping. The information related to slot locations may include information to indicate whether the slots where the long PUCCH is mapped are continuous or non-continuous.

Examples of methods of determining the period and the location for allocating a long PUCCH, whether to enable or disable frequency hopping and the pattern of frequency hopping, will be described below.

<Period/Location to Allocate Long PUCCH>

The period and/or the location for allocating a long PUCCH in each slot can be determined using the method described in the first example above. As for the period and/or the location for allocating a long PUCCH, different values may be configured for each of multiple slots, or common values may be configured for a number of slots. The period and/or the location for allocating the long PUCCH may be configured based on the configuration of each slot (slot type).

<Number of Long PUCCH Slots/Locations of Slots>

The user terminal may determine the number and/or the locations of slots to use to transmit the long PUCCH, in an explicit way, based on information reported from the radio base station. For example, the radio base station reports information about the number and/or the locations of slots, to the user terminal, by using higher layer signaling (such as RRC signaling and/or broadcast signals) and/or downlink control information (DCI).

The downlink control information may be user terminal-specific control information (also referred to as "UE-specific DCI," "UE-specific PDCCH," or "UE-specific search space") or may be control information to apply to a number of user terminals in common ("UE-common DCI," "group-common PDCCH," or "common search space"). For example, when the same number of slots and/or locations of slots are configured for a predetermined group of UEs, the radio base station includes information related to the number and/or the locations of slots to use to transmit the long PUCCH in user terminal-common control information, and reports this.

Alternatively, the user terminal may determine the number and/or the locations of slots to use to transmit a long PUCCH, in an implicit way, based on at least one of the size of uplink control information (UCI), the type of UCI (UCI type), and the starting position of the PUCCH in the time direction. In this case, as in the method of determining the period and/or the location for allocating a long PUCCH, which has been described earlier, the number and/or the locations of slots to use to transmit the long PUCCH may be associated with at least one of the size of uplink control information (UCI), the type of UCI (UCI type), and the starting position of the PUCCH in the time direction, and the user terminal may make selection autonomously.

<Setting of Frequency Hopping>

The user terminal can determine whether to enable or disable inter-slot frequency hopping based on information reported from the radio base station. For example, the radio base station reports information about whether to enable or disable inter-slot frequency hopping to the user terminal by using higher layer signaling (for example, RRC signaling, broadcast signal and so forth) and/or downlink control information (DCI).

Also, intra-slot frequency hopping and inter-slot frequency hopping may be independently enabled (see FIG. 7). FIG. 7 shows a table specifying whether to enable or disable intra-slot frequency hopping and inter-slot frequency hopping, in combination.

Figure 8:
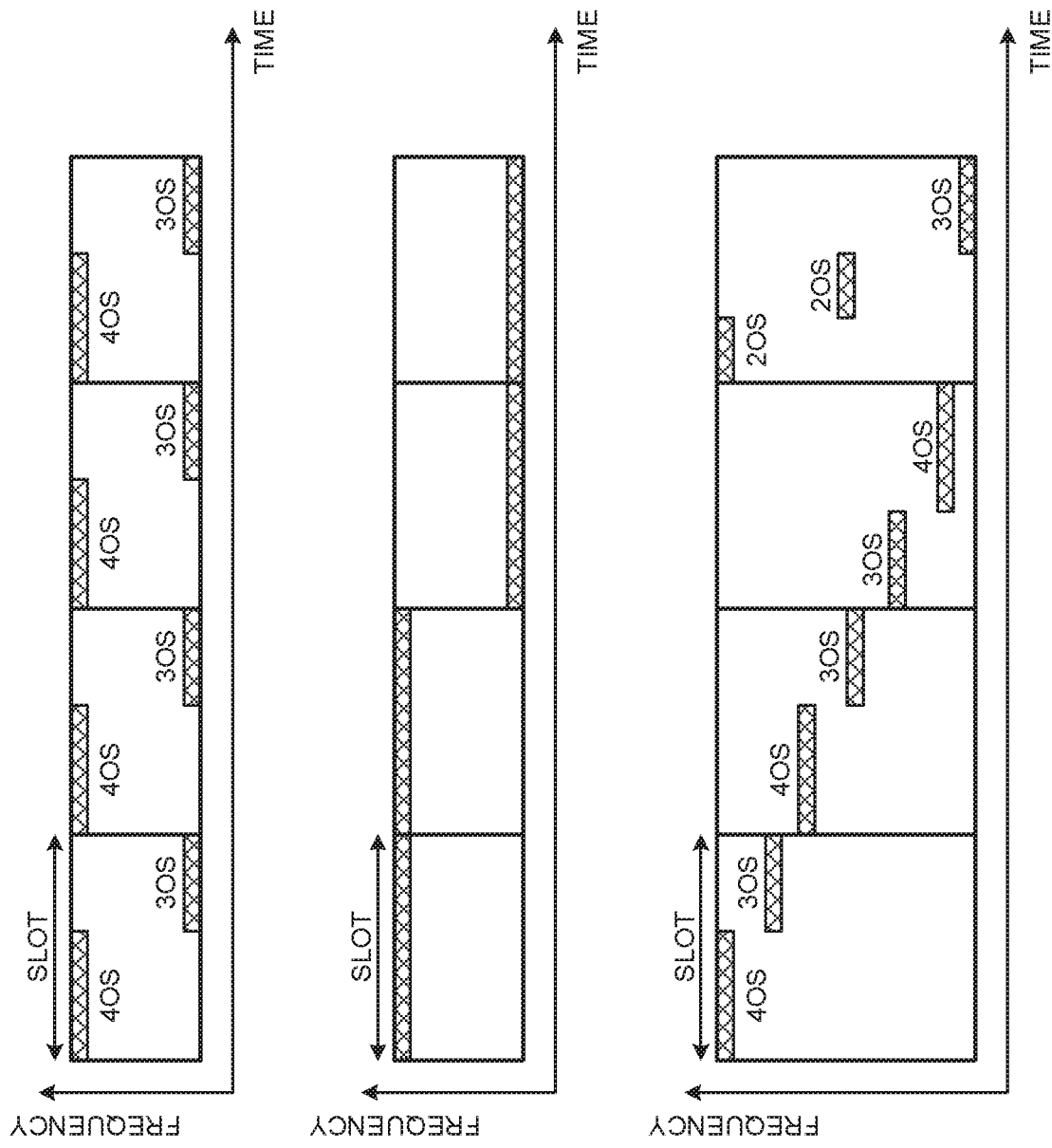
FIGS. 8A to 8C are diagrams, each showing another example of controlling a long PUCCH, according to the first example.

For example, a user terminal where frequency hopping mode 1 is enabled uses both intra-slot frequency hopping and inter-slot frequency hopping (see FIG. 8C). A user terminal where frequency hopping mode 2 is enabled uses intra-slot frequency hopping, but does not use inter-slot frequency hopping (see FIG. 8A). A user terminal where frequency hopping mode 3 is enabled uses inter-slot frequency hopping, without using intra-slot frequency hopping (see FIG. 8B). A user terminal where frequency hopping mode 4 is enabled uses neither intra-slot frequency hopping nor inter-slot frequency hopping. Note that the frequency hopping patterns shown in FIGS. 8A, 8B, and 8C are simply examples, and the applicable patterns are not limited thereto.

In this way, by allowing intra-slot frequency hopping and inter-slot frequency hopping to be enabled independently, it is possible to enable frequency hopping for long PUCCHs, flexibly, based on user capability information, the situation of communication and so on.

Alternatively, the user terminal may be controlled to use one of intra-slot frequency hopping and inter-slot frequency hopping. For example, if intra-slot frequency hopping is enabled, inter-slot frequency hopping is disabled. Otherwise (for example, if intra-slot frequency hopping is disabled), inter-slot frequency hopping is enabled. By this means, it is possible to reduce the load of transmission processing in the user terminal.

Alternatively, the user terminal may be configured to always use inter-slot frequency hopping regardless of whether intra-slot frequency hopping is enabled or disabled. Also, the user terminal may be configured to always use intra-slot frequency hopping regardless of whether inter-slot frequency hopping is enabled or disabled.

When using intra-slot frequency hopping alone, without using inter-slot frequency hopping, a long PUCCH to be transmitted over multiple slots and long PUCCHs mapped in the slots can co-exist adequately. In addition, when inter-slot frequency hopping alone is used, without using intra-slot frequency hopping, it is possible to reduce the overhead of reference signals, and reduce the number of times (time cycle) to make a transition in the frequency direction. When inter-slot frequency hopping and intra-slot frequency hopping are used, it is possible to achieve a frequency diversity effect, and, furthermore, control the transmission of long PUCCHs flexibly.

<Frequency Hopping Pattern>

When inter-slot frequency hopping is enabled for long PUCCHs, a user terminal determines the frequency hopping pattern based on predetermined information and/or predetermined rules. Hereinafter, the method for determining frequency hopping patterns in the time domain and in the frequency domain will be described. Note that, as for intra-slot frequency hopping, the configuration shown in the first example may be applied.

[Time Domain]

Option 1

The user terminal controls the period to transmit a long PUCCH to be equal as much as possible before and after a frequency hop, between different slots (option 1). For example, assuming that long PUCCHs before and after a frequency hop are a first part and a second part, respectively, the first part may be constituted by half of multiple slots, and the second part may be constituted by the rest of the parts (for example, slots).

Considering that the sum of these slots is an odd number, a floor function may be applied to ½ of multiple slots (floor (multiple slots/2)), so as to make the number of slots in the first part an integer. Note that the value obtained by applying a floor function to ½ of multiple slots may be applied to the second part, and the rest of the slots (multiple slots—the number of slots of the second part) may be made the first part. This makes it possible to coordinate the number of slots as much as possible before and after a frequency hop where multiple slots are used.

Option 2

In addition, the user terminal may control the period for transmitting a long PUCCH to be equal as much as possible before and after a frequency hop, by taking into account the part of UL communication in each slot that constitutes multiple slots (option 2). For example, assuming that long PUCCHs before and after a frequency hop are a first part and a second part, respectively, slots to correspond to each part are selected by taking into account the UL part of each slot, so as to make the UL parts of the first part and the second part uniform.

For example, the first part is constituted by slots corresponding to half of the total of the UL communication parts of each slot, and the second part is constituted by the rest of the slots. Considering that the number of slots corresponding to half of the total of UL communication parts is an odd number, the number of slots of the first part to an integer by applying a floor function (floor (UL communication part/2). Note that the first part and the second part may be switched to determine the number of slots corresponding to each part. This makes it possible to coordinate the part of UL communication as much as possible before and after a frequency hop.

Option 3

Also, the user terminal may exert control so that long PUCCHs are mapped to different frequencies per predetermined slots (for example, every y slots) (option 3). The value of y may be one or two, for example. Also, the value of y may be reported from the radio base station to the user terminal, via higher layer signaling and/or downlink control information. In this way, the location (for example, slots) for mapping long PUCCHs can be switched and configured flexibly in the time domain.

[Frequency Domain]

The user terminal controls a long PUCCH to be allocated symmetrically before and after a frequency hop (for example, across different slots), with respect to a UE-specific UL center frequency or the DC subcarrier transmitted by the user terminal. The UE-specific UL center frequency refers to the center frequency of an uplink frequency bandwidth that is configured for each user terminal.

In this way, by setting a reference value for frequency hopping for each user terminal, even when the bandwidth to use for communication is configured per user terminal (for example, configured in a part of the system band), long PUCCHs can be transmitted appropriately for each user terminal.

Alternatively, the user terminal controls a long PUCCH to be allocated symmetrically before and after a frequency hop with respect to a UE-specific DL center frequency or the DC subcarrier transmitted by the user terminal. The UE-specific DL center frequency refers to the center frequency of a downlink frequency bandwidth that is configured for each user terminal. By using the center frequency of the frequency band for DL communication, even when the DL and UL communication bands and bandwidths are the same and the UL center frequency or the DC subcarrier is not configured, it is still possible to transmit long PUCCHs properly.

Alternatively, the user terminal may control a long PUCCH to be allocated symmetrically before and after a frequency hop with respect to a cell-specific center frequency. For example, when the user terminal communicates using the whole frequency band used in the cell (for example, CC), the same control method as in existing LTE systems can be used by using frequency domain hopping with respect to the center frequency of the cell.

Also, when a number of frequency bands (for example, frequency bands for use in UL communication) are configured in the user terminal, hopping of long PUCCHs may be enabled among these multiple frequency bands. When frequency hopping is enabled across multiple frequency bands configured in the terminal, the user terminal may provide gap periods (GPs) before and after a frequency hop in the time direction. By providing a gap period in the time direction, the user terminal can reserve a period for RF retuning when a long PUCCH hops between different frequency fields.

Frequency hopping does not need to be enabled between multiple frequency fields configured in the same carrier (for example, CC), and may be executed using frequency fields that are respectively configured in different carriers. Also, a combination of intra-carrier frequency hopping and inter-carrier frequency hopping may be used.

(Radio Communication System)

Now, the structure of the radio communication system according to one embodiment of the present invention will be described below. In this radio communication system, communication is performed using one or a combination of the radio communication methods according to the herein-contained embodiments of the present invention.

Figure 9:
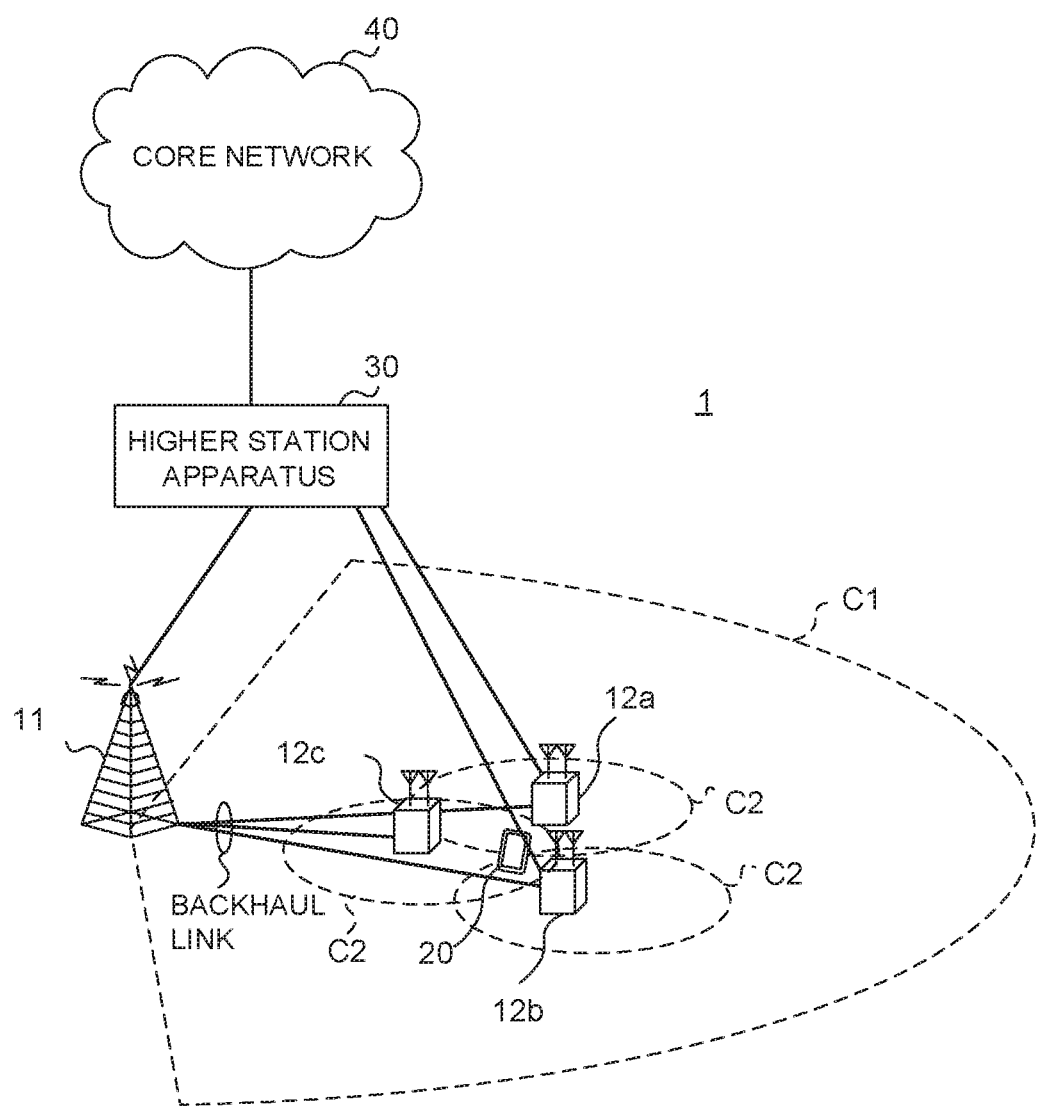
FIG. 9 is a diagram to show an exemplary schematic structure of a radio communication system according to the present embodiment.

FIG. 9 is a diagram to show an exemplary schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be seen as a system to implement these.

The radio communication system 1 includes a radio base station 11 that forms a macro cell C1, with a relatively wide coverage, and radio base stations 12a to 12c that are placed within the macro cell C1 and that form small cells C2, which are narrower than the macro cell C1. Also, user terminals 20 are placed in the macro cell C1 and in each small cell C2. The arrangement, number and so on of cells and user terminals 20 are not limited to the examples illustrated in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

Furthermore, the user terminals 20 can communicate by using time division duplexing (TDD) and/or frequency division duplexing (FDD) in each cell. Furthermore, in each cell (carrier), a single numerology may be employed, or a plurality of different numerologies may be employed.

A structure may be employed here in which wire connection (for example, optical fiber in compliance with the CPRI (Common Public Radio Interface), the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) and/or OFDMA are applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or contiguous resource blocks per terminal, and allowing a plurality of terminals to use mutually different bands. Note that the uplink and downlink radio access schemes are not limited to this combination, and other radio access schemes may be used as well.

In the radio communication system 1, a downlink shared channel (PDSCH (Physical Downlink Shared CHannel)), which is used by each user terminal 20 on a shared basis, a broadcast channel (PBCH (Physical Broadcast CHannel)), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and/or PUSCH scheduling information, and so on, is communicated by the PDCCH.

Note that scheduling information may be reported via DCI. For example, the DCI to schedule receipt of DL data may be referred to as "DL assignment," and the DCI to schedule transmission of UL data may be referred to as "UL grant."

The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH (Physical Uplink Shared CHannel)), which is used by each user terminal 20 on a shared basis, an uplink control channel (PUCCH (Physical Uplink Control CHannel)), a random access channel (PRACH (Physical Random Access CHannel)) and so on are used as uplink channels. User data, higher layer control information and so on are communicated by the PUSCH. Also, in the PUCCH, downlink radio quality information (CQI (Channel Quality Indicator)), delivery acknowledgment information, scheduling requests (SRs) and so on are communicated. By means of the PRACH, random access preambles for establishing connections with cells are communicated.

In the radio communication system 1, cell-specific reference signals (CRSs), channel state information reference signals (CSI-RSs), demodulation reference signals (DMRSs), positioning reference signals (PRSs) and so on are communicated as downlink reference signals. Also, in the radio communication system 1, measurement reference signals (SRS (Sounding Reference Signal)), demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 10:
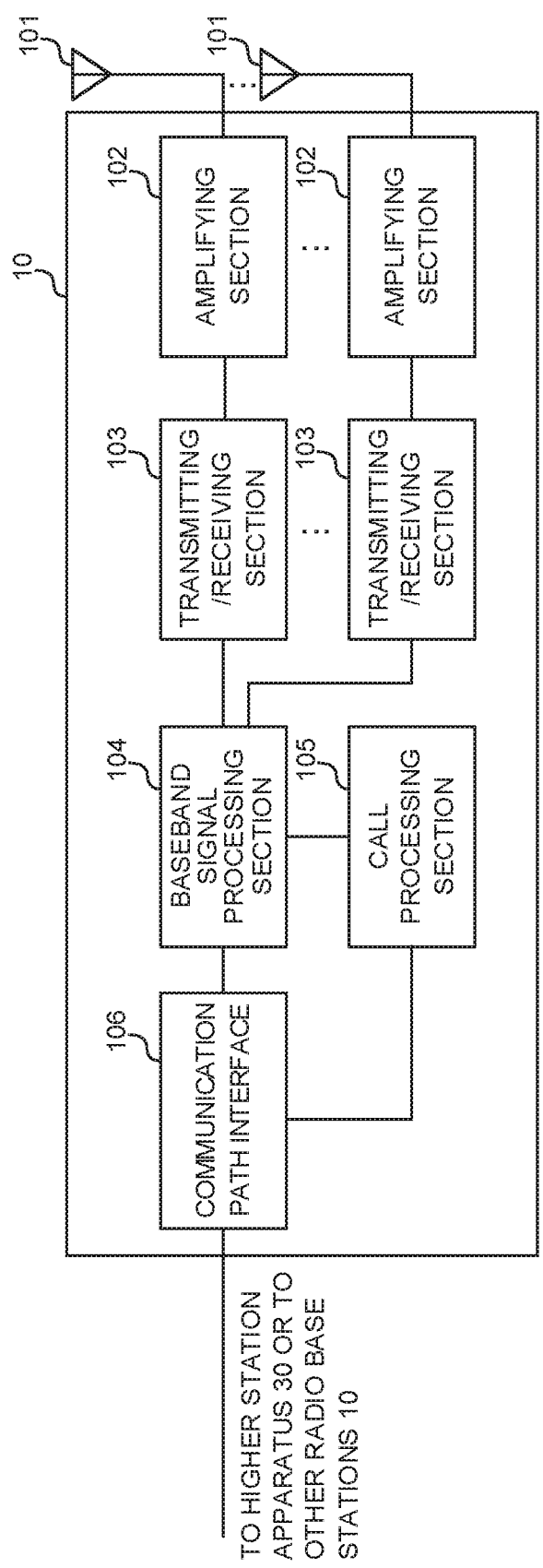
FIG. 10 is a diagram to show an exemplary overall structure of a radio base station according to the present embodiment.

FIG. 10 is a diagram to show an exemplary overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 receive an uplink control channel transmitted from the user terminal. Also, the transmitting/receiving sections 103 may transmit at least one of the period (the number of symbols) for allocating a PUCCH, the location for allocating a long PUCCH, and information to indicate whether intra-slot frequency hopping is enabled or disabled. In addition, the transmitting/receiving sections 103 may transmit at least one of the number of slots to use to transmitting a long PUCCH, the locations of slots, and information to indicate whether inter-slot frequency hopping is enabled or disabled. The information related to the locations of slots may be information to indicate whether the slots where a long PUCCH is mapped are continuous or non-continuous.

Figure 11:
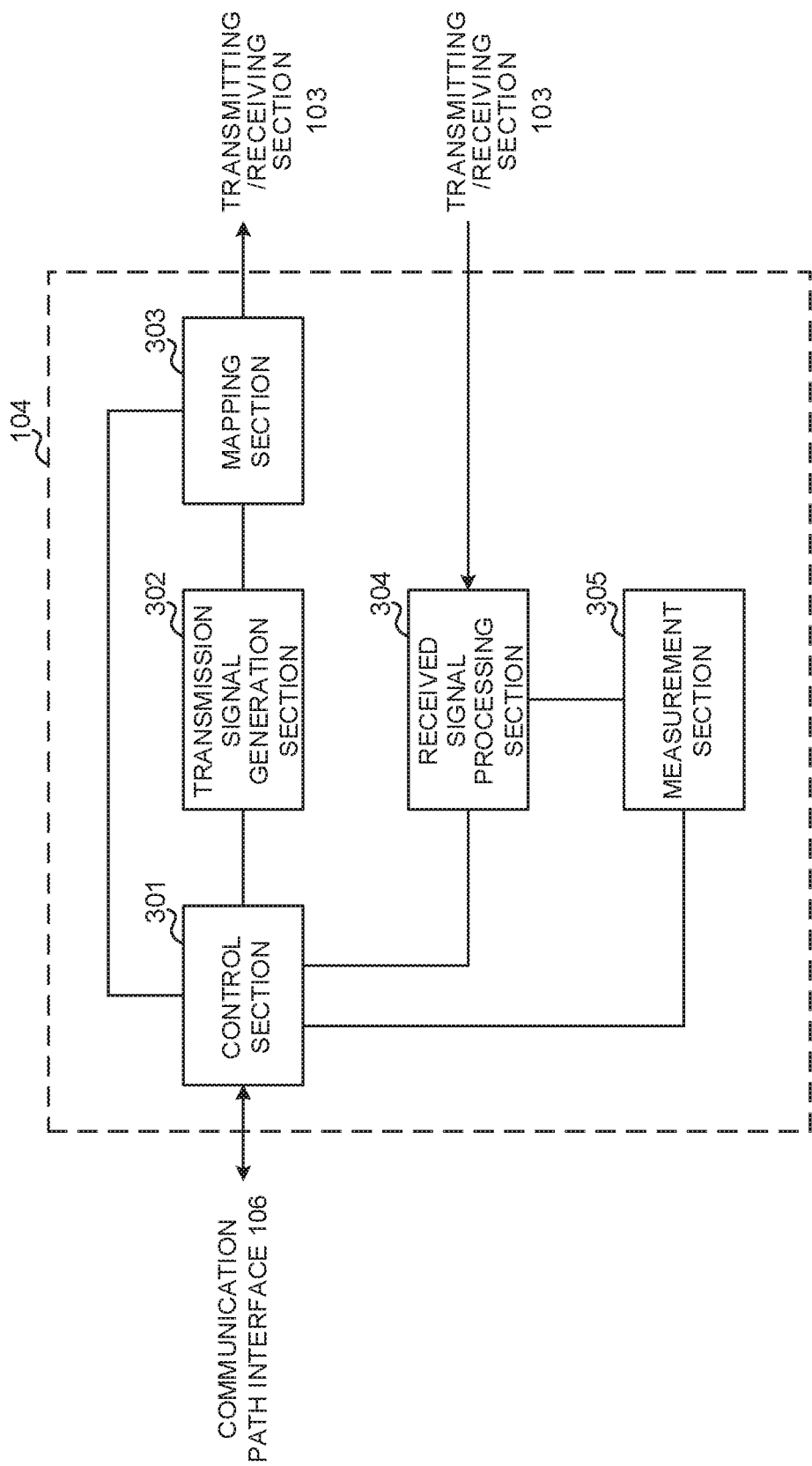
FIG. 11 is a diagram to show an exemplary functional structure of a radio base station according to the present embodiment.

FIG. 11 is a diagram to show an exemplary functional structure of a radio base station according to the present embodiment. Note that, although this example will primarily show functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals communicated in the PDCCH and/or the EPDCCH, such as delivery acknowledgment information). The control section 301 controls the generation of downlink control signals, downlink data signals and so on, based on the results of deciding whether or not retransmission control is necessary for uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DM-RS, etc.) and so on.

The control section 301 also controls the scheduling of uplink data signals (for example, signals transmitted in the PUSCH), uplink control signals (for example, signals transmitted in the PUCCH and/or the PUSCH, such as delivery acknowledgment information), random access preambles (for example, signals transmitted in the PRACH), and uplink reference signals.

Based on the format of uplink control information and/or the starting position of the above uplink control channel in the time direction, the control section 301 determines the allocation period and/or the allocation location of the uplink control channel transmitted from the user terminal, and controls the receipt.

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink data allocation information, and/or UL grants, which report uplink data allocation information, based on commands from the control section 301. DL assignments and UL grants are both DCI, and follow the DCI format. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminal 20 (uplink control signals, uplink data signals, uplink reference signals, etc.). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signal. The measurement section 305 can be constituted by a measurer, a measurement circuit or measurement apparatus that can be described based on general understanding of the technical field to which the present invention pertains.

For example, the measurement section 305 may perform RRM (Radio Resource Management) measurements, CSI (Channel State Information) measurements and so on, based on the received signals. The measurement section 305 may measure the received power (for example, RSRP (Reference Signal Received Power)), the received quality (for example, RSRQ (Reference Signal Received Quality), SINR (Signal to Interference plus Noise Ratio), SNR (Signal to Noise Ratio), etc.), the signal strength (for example, RSSI (Received Signal Strength Indicator)), channel information (for example, CSI), and so on. The measurement results may be output to the control section 301.

(User Terminal)

Figure 12:
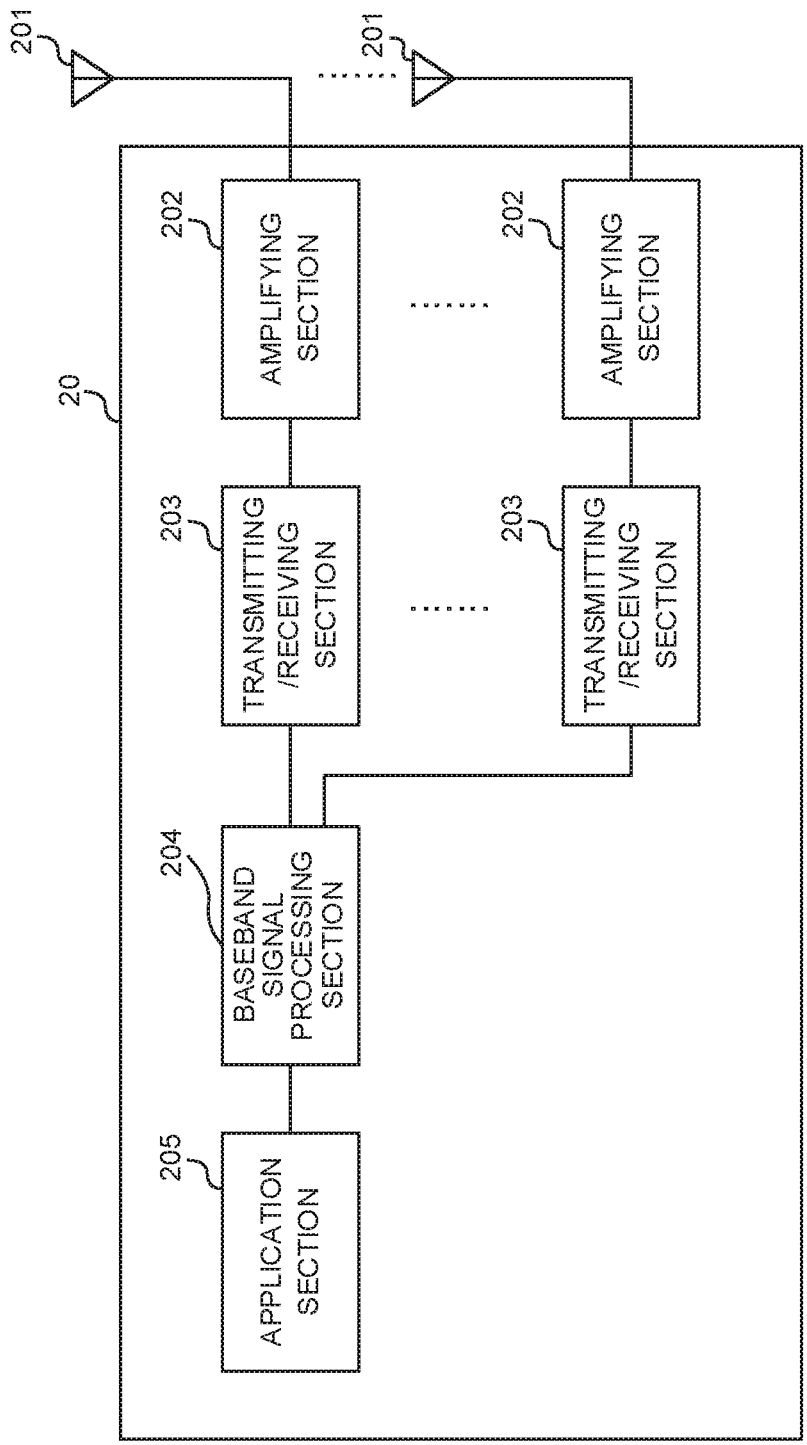
FIG. 12 is a diagram to show an exemplary overall structure of a user terminal according to the present embodiment.

FIG. 12 is a diagram to show an exemplary overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

The baseband signal processing section 204 performs, for the baseband signal that is input, an FFT process, error correction decoding, a retransmission control receiving process and so on. Downlink user data is forwarded to the application section 205. The application section 205 performs processes related to higher layers above the physical layer and the MAC layer, and so on. Also, in the downlink data, the broadcast information can be also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 transmit the uplink control information using an uplink control channel. Also, the transmitting/receiving sections 203 may transmit at least one of the period (the number of symbols) for allocating a PUCCH, the location for allocating a long PUCCH, and information to indicate whether intra-slot frequency hopping is enabled or disabled. In addition, the transmitting/receiving sections 203 may transmit at least one of the number of slots to use to transmit a long PUCCH, the locations of slots, and information to indicate whether inter-slot frequency hopping is enabled or disabled. The information related to the locations of slots may be information to indicate whether the slots where a long PUCCH is mapped are continuous or non-continuous.

Figure 13:
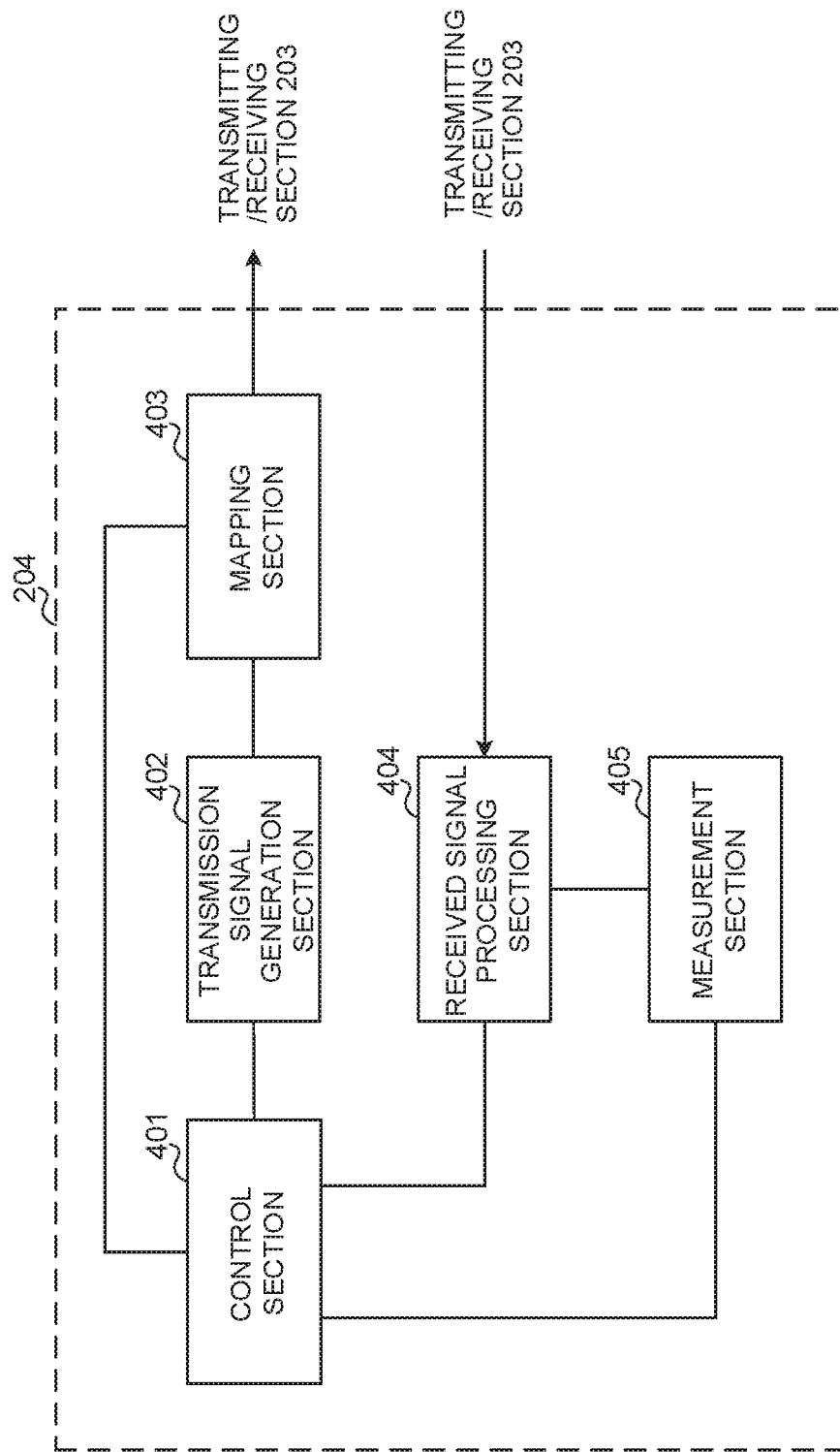
FIG. 13 is a diagram to show an exemplary functional structure of a user terminal according to the present embodiment.

FIG. 13 is a diagram to show an exemplary functional structure of a user terminal according to one embodiment of the present invention. Note that, although this example will primarily show functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals by the mapping section 403, and so on. Furthermore, the control section 401 controls the signal receiving processes in the received signal processing section 404, the measurements of signals in the measurement section 405, and so on.

The control section 401 acquires the downlink control signals and downlink data signals transmitted from the radio base station 10, via the received signal processing section 404. The control section 401 controls the generation of uplink control signals and/or uplink data signals based on the results of deciding whether or not retransmission control is necessary for the downlink control signals and/or downlink data signals, and so on.

The control section 401 controls the transmission of uplink control information using an uplink control channel, and determines the allocation period and/or the allocation location of an uplink control channel based on at least one of the format of uplink control information, the starting position of the uplink control channel in the time direction, and information reported from the radio base station. Also, the control section 401 controls the transmission of the uplink control channel by using frequency hopping within one frequency band and/or a plurality of frequency bands configured for the user terminal.

Also, when frequency hopping of the uplink control channel is enabled across a plurality of frequency bands, the control section 401 may provide a gap period in the uplink control channel before and after a frequency hop. In addition, the control section 401 may independently enable first frequency hopping where frequency hopping is applied to the uplink control channel within the same slot, and second frequency hopping where frequency hopping is applied to the uplink control channel across multiple slots, or enable these in association with each other. Furthermore, when applying frequency hopping to the uplink control channel across multiple slots, the control section 401 may control the transmission of the uplink control channel using multiple adjacent slots or non-adjacent slots.

The transmission signal generation section 402 generates uplink signals (uplink control signals, uplink data signals, uplink reference signals, etc.) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information that is acquired through the receiving processes to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. The measurement section 405 can be constituted by a measurer, a measurement circuit or measurement apparatus that can be described based on general understanding of the technical field to which the present invention pertains.

For example, the measurement section 405 may perform RRM measurements, CSI measurements and so on based on the received signals. The measurement section 405 may measure the received power (for example, RSRP), the received quality (for example, RSRQ, SINR, SNR, etc.), the signal strength (for example, RSSI), channel information (for example, CSI), and so on. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 14:
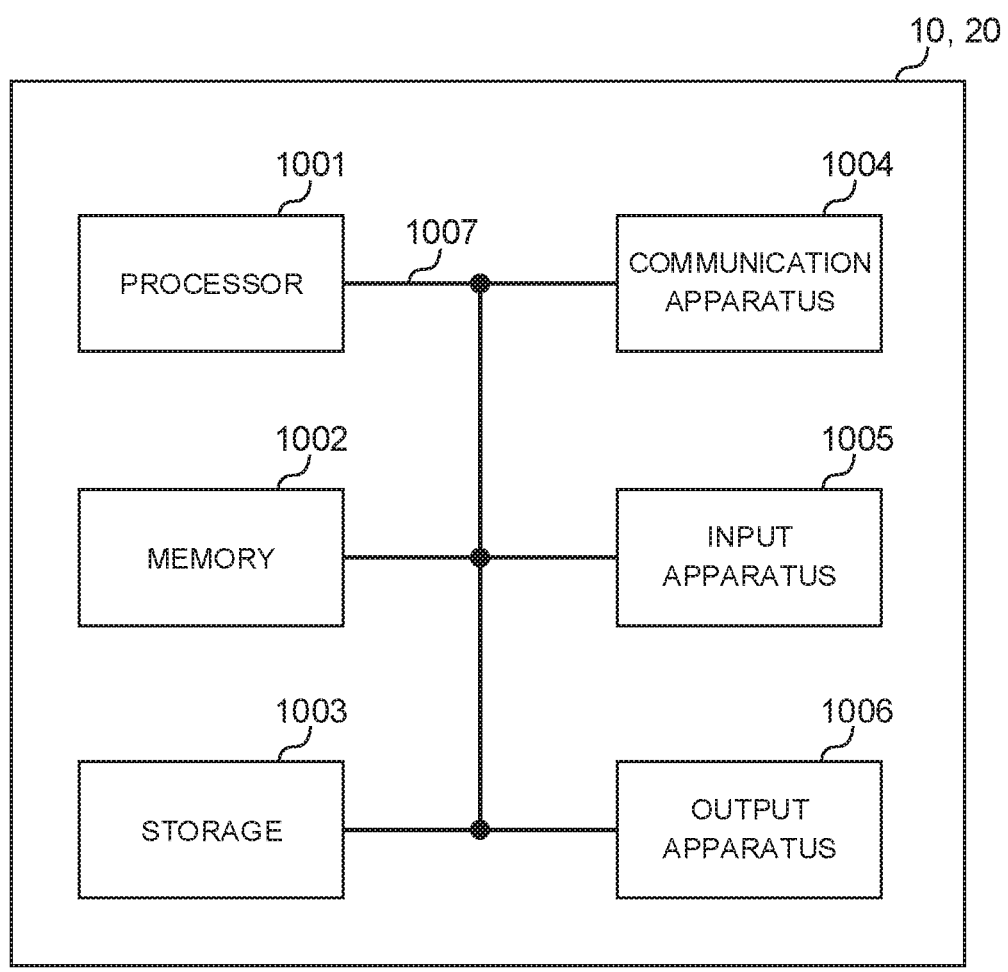
FIG. 14 is a diagram to show an exemplary hardware structure of a radio base station and a user terminal according to the present embodiment.

For example, the radio base station, user terminals and so on according to one embodiment of the present invention may function as a computer that executes the processes of the radio communication method of the present invention. FIG. 14 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on one or more processors. Note that the processor 1001 may be implemented with one or more chips.

The functions of the radio base station 10 and the user terminal 20 are implemented by allowing hardware such as the processor 1001 and the memory 1002 to read predetermined software (programs), thereby allowing the processor 1001 to do calculations, the communication apparatus 1004 to communicate, and the memory 1002 and the storage 1003 to read and/or write data.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules, data and so forth from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or multiple slots in the time domain. A subframe may be a fixed time duration (for example, 1 ms) not dependent on the numerology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on numerology. Also, a slot may include a plurality of minislots. Each minislot may be comprised of one or more symbols in the time domain. Also, a minislot may be referred to as a "subslot."

A radio frame, a subframe, a slot, a minislot and a symbol all represent the time unit in signal communication. A radio frame, a subframe, a slot, a minislot and a symbol may be each called by other applicable names. For example, one subframe may be referred to as a "transmission time interval (TTI)," or a plurality of consecutive subframes may be referred to as a "TTI," or one slot or mini-slot may be referred to as a "TTI." That is, a subframe and/or a TTI may be a subframe (1 ms) in existing LTE, may be a shorter period than 1 ms (for example, one to thirteen symbols), or may be a longer period of time than 1 ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that, when a TTI is given, the period of time (for example, the number of symbols) in which transport blocks, code blocks and/or codewords are actually mapped may be shorter than the TTI.

Note that, when one slot or one minislot is referred to as a "TTI," one or more TTIs (that is, one or multiple slots or one or more minislots) may be the minimum time unit of scheduling. Also, the number of slots (the number of minislots) to constitute this minimum time unit of scheduling may be controlled.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on. Note that a long TTI (for example, a normal TTI, a subframe, etc.) may be replaced with a TTI having a time duration exceeding 1 ms, and a short TTI (for example, a shortened TTI) may be replaced with a TTI having a TTI length less than the TTI length of a long TTI and not less than 1 ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one minislot, one subframe or one TTI in length. One TTI and one subframe each may be comprised of one or more resource blocks. Note that one or more RBs may be referred to as a "physical resource block (PRB (Physical RB))," a "subcarrier group (SCG)," a "resource element group (REG)," an "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, minislots, symbols and so on described above are merely examples. For example, configurations pertaining to the number of subframes included in a radio frame, the number of slots included per subframe or radio frame, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented using other applicable information. For example, a radio resource may be specified by a predetermined index.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, in a memory), or may be managed in a control table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent in an implicit way (for example, by not reporting this piece of information, by reporting another piece of information, and so on). Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (D2D (Device-to-Device)). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by their upper nodes. In a network comprised of one or more network nodes with base stations, it is clear that various operations that are performed so as to communicate with terminals can be performed by base stations, one or more network nodes (for example, MMEs (Mobility Management Entities), S-GWs (Serving-Gateways) and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used herein only for convenience, as a method for distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be interpreted as "access."

As used herein, when two elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

In the present specification, the phrase "A and B are different" may mean "A and B are different from each other." The terms such as "leave" "coupled" and the like may be interpreted as well.

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The invention claimed is:

1. A terminal in communication with a base station, comprising:
    a transmitter that transmits uplink control information using an uplink control channel; and
    a processor that controls, based on information transmitted from the base station, application of intra-slot frequency hopping for the uplink control channel or inter-slot frequency hopping for the uplink control channel,
    wherein, in the information transmitted from the base station, the application of intra-slot frequency hopping for the uplink control channel and the application of inter-slot frequency hopping for the uplink control channel are set separately, and
    wherein, when the intra-slot frequency hopping is enabled between a first part and a second part in a slot, the processor determines a number of symbols for the uplink control channel in the first part and the second part based on an integer value obtained by applying a floor function to half of the number of symbols for the uplink control channel per slot.

2. The terminal according to claim 1, wherein, if an uplink control channel is used to repeatedly transmit uplink control information over a plurality of slots, the processor performs frequency hopping for the uplink control channel in different slots.

3. The terminal according to claim 1, wherein, if inter-slot frequency hopping for the uplink control channel is configured, the processor assumes that intra-slot frequency hopping for the uplink control channel is not configured.

4. The terminal according to claim 2, wherein the processor controls at least one of an allocation duration and an allocation position of the uplink control channel to be the same in each slot.

5. The terminal according to claim 2, wherein, when inter-slot frequency hopping for the uplink control channel is configured, the processor assumes that intra-slot frequency hopping for the uplink control channel is not configured.

6. The terminal according to claim 3, wherein the processor determines a number of slots for transmitting the uplink control channel based on the information transmitted from the base station.

7. The terminal according to claim 3, wherein the processor controls at least one of an allocation duration and an allocation position of the uplink control channel to be the same in each slot.

8. A base station in communication with a terminal, comprising:
 a receiver that receives uplink control information that is transmitted from the terminal using an uplink control channel; and
 a processor that configures, in the terminal, application of intra-slot frequency hopping for the uplink control channel or inter-slot frequency hopping for the uplink control channel,
 wherein, when the intra-slot frequency hopping is enabled between a first part and a second part in a slot, the terminal determines a number of symbols for the uplink control channel in the first part and the second part based on an integer value obtained by applying a floor function to half of the number of symbols for the uplink control channel per slot.

9. A radio communication method for a terminal in communication with a base station, comprising:
 transmitting uplink control information using an uplink control channel; and
 controlling, based on information transmitted from the base station, application of intra-slot frequency hopping for the uplink control channel or inter-slot frequency hopping for the uplink control channel,
 wherein, in the information transmitted from the base station, the application of intra-slot frequency hopping for the uplink control channel and the application of inter-slot frequency hopping for the uplink control channel are set separately, and
 wherein, when the intra-slot frequency hopping is enabled between a first part and a second part in a slot, a number of symbols for the uplink control channel in the first part and the second part is determined based on an integer value obtained by applying a floor function to half of the number of symbols for the uplink control channel per slot.

10. A system comprising a terminal and a base station, wherein:
 the terminal comprises:
  a transmitter that transmits uplink control information using an uplink control channel; and
  a processor that controls, based on information transmitted from the base station, application of intra-slot frequency hopping for the uplink control channel or inter-slot frequency hopping for the uplink control channel, and
 the base station comprises:
  a receiver that receives the uplink control information that is transmitted from the terminal using the uplink control channel,
 wherein, in the information transmitted from the base station, the application of intra-slot frequency hopping for the uplink control channel and the application of inter-slot frequency hopping for the uplink control channel are set separately, and
 wherein, when the intra-slot frequency hopping is enabled between a first part and a second part in a slot, the processor determines a number of symbols for the uplink control channel in the first part and the second part based on an integer value obtained by applying a floor function to half of the number of symbols for the uplink control channel per slot.

* * * * *